April 1, 1930.  W. A. RUGGLES  1,752,813
MAGNESIUM COVERED CALCIUM WIRE
Filed Jan. 9, 1926
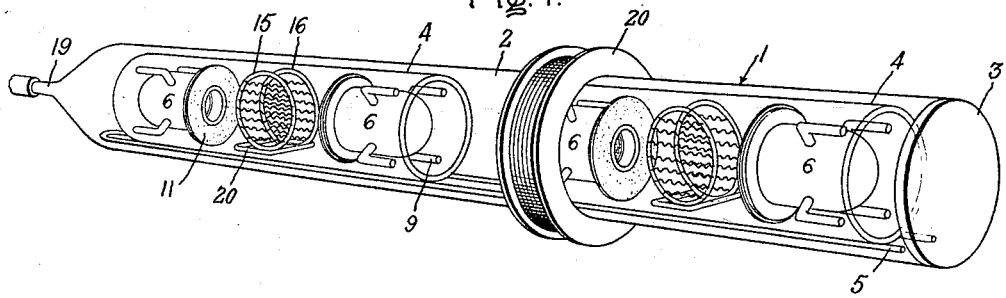
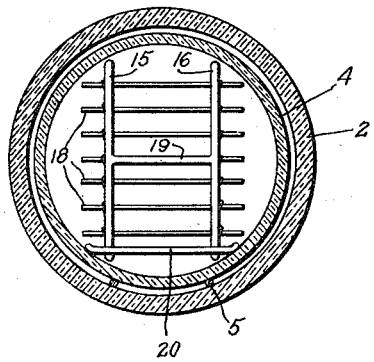
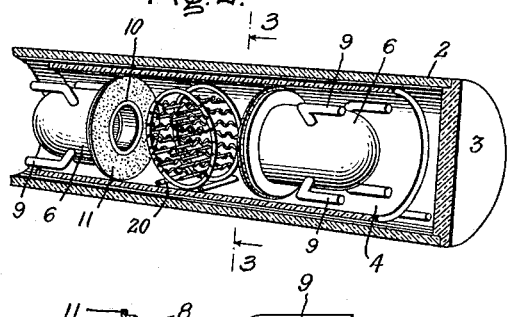
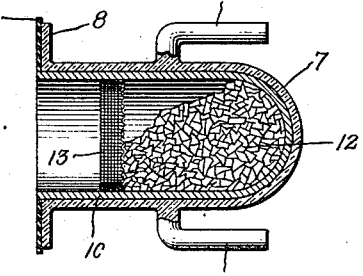
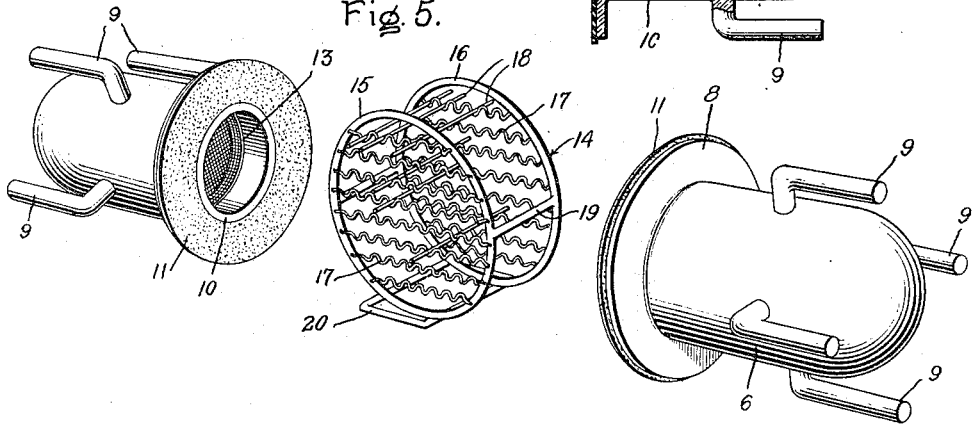
Inventor:
William A. Ruggles,
by *Alexander F. ____*
His Attorney.

Patented Apr. 1, 1930

1,752,813

UNITED STATES PATENT OFFICE

WILLIAM ANDREW RUGGLES, OF SCHENECTADY, NEW YORK, ASSIGNOR TO GENERAL ELECTRIC COMPANY, A CORPORATION OF NEW YORK

MAGNESIUM-COVERED CALCIUM WIRE

Application filed January 9, 1926. Serial No. 80,322.

The present invention relates to the application to metals of a protective metal coating and in particular to the metal coating of chemically highly reactive metals, such for example, as calcium, which can not be readily coated by the processes which are commonly employed, such as electroplating or galvanizing.

In the production of a vacuum in electric discharge devices it is common to employ an alkali or an alkaline earth metal as a final means for removing gases which may remain in the device after the vacuum has been reduced to a certain pressure. While the metal calcium has been employed in this connection, its use has heretofore been limited, owing to the fact that it rapidly oxidizes, and, therefore, loses its power as a "getter." It is one of the objects of my invention to provide calcium with a metal coating which will protect the calcium from oxidation.

In carrying my invention into effect, the metal to be coated is subjected, in a vacuum, to the vapor of a coating metal. In the case of calcium, the coating metal chosen preferably should not deleteriously effect the beneficial action of calcium as a gas-absorbent. Magnesium is an advantageous coating metal with this end in view. I have found that calcium wires, when provided with a magnesium coating, may be exposed to the atmosphere for approximately 100 hours, and at the end of that period may still function effectively as "getters."

The novel features which I believe to be characteristic of my invention are set forth with particularity in the appended claims. My invention itself, however, both as to its organization and method of operation will best be understood by reference to the following specification taken in connection with the accompanying drawing in which Fig. 1 is a perspective view of a vacuum furnace employing a pair of hollow cylindrical members within which are placed the receptacles for the magnesium; Fig. 2 is a longitudinal cross sectional view taken through one end of the vacuum furnace; Fig. 3 is an enlarged cross section of the furnace taken on the line 3—3 of Fig. 2; Fig. 4 is a detail view, on an enlarged scale, of the receptacle which contains the magnesium; Fig. 5 is a perspective view, on an enlarged scale, of the receptacles holding the magnesium and the associated rack or holder for the calcium wires.

Referring to the drawing, I have indicated at 1 a vacuum furnace which comprises an elongated hollow glass receptacle 2 having at one end a removable glass closure member or cap 3. Associated with the furnace are a plurality of hollow glass cylinders 4, open at both ends. The cylinders 4 are of slightly smaller diameter than the receptacle 1, and are supported out of contact therewith by means of a track 5, which is made of nickel, and upon which the cylinders may be slid into position in the furnace.

Associated with each hollow cylinder 4, is a pair of receptacles 6. As shown best in Fig. 4, each receptacle 6 comprises an outer portion 7, closed at one end and open at the other, the open end being provided with a surrounding and outwardly extending flange 8. The portion 7 is made of transparent, heat resistant, vitreous material. The material used in the present case consists of a borosilicate glass containing an appreciable amount of aluminum and is generally known in the arts as "pyrex" or "pyrex glass." A plurality of glass spacing fingers 9 extend from the glass portion and serve to space receptacle 6 from the hollow cylinder 4. The glass portion 7 is provided with a nickel lining 10 which fits loosely within the glass portion, to allow for expansion, and which extends slightly beyond the flange 8 to provide a support for a mica washer 11. The washer 11 has an external diameter substantially equal to the internal diameter of the cylinder 4. The magnesium to be evaporated is placed within the receptacle 6, as indicated at 12, and is retained therein by means of a fine nickel wire mesh 13.

The calcium wires which are to be coated, are first cleaned with emery cloth and then placed upon a nickel rack 14 which comprises two end rings 15 and 16, each ring being provided with a plurality of parallel wires 17 having corrugated portions adapted to hold the calcium wires 18 in position. The end rings are tied together by means of bars 19 which are permanently secured to the end rings in any suitable manner. The rack is supported on a hollow rectangular shaped metal member 20.

In the assembly of the device, the rack 14 carrying the calcium wires to be coated is placed within a cylinder 4. The loaded receptacles 6 then are inserted from each open end, into the cylinder 4, and the cylinder is moved into position in the vacuum furnace. When the desired number of cylinders have been placed in the vacuum furnace, the cap 3 is applied thereto and a pump, (not shown), is attached to the end 19 of the furnace, and the latter evacuated to a pressure of approximately two microns of mercury. A high frequency coil 20 then is slid over the vacuum furnace and current supplied thereto. The coil is placed successively over the different receptacles 6 for periods which will vary from two to five minutes. The heat developed by the coil vaporizes the magnesium in the receptacle 6. The vapor is deposited on the relatively cool calcium wires, completely coating the calcium wires with the vaporized metal. I have found that if the rack 14 is spaced from each receptacle 6 a distance of approximately 1½ inches the calcium wires are completely covered with a magnesium coating of a desirable thickness.

The mica washers applied to the open ends of receptacles 6 serve to confine the magnesium vapors between the receptacles and to keep the end portions of cylinder 4 clear from magnesium deposits. While I have illustrated a method for coating calcium, obviously metals other than calcium may be coated in a similar manner. Although I employ the expression "alkaline metal" in certain of the claims I do not intend such claims to be restricted by this expression to metals of the alkaline earth group alone, but to include metals of the alkali group as well. Various modifications of my invention may be made without departing from the scope of my invention as set forth in the appended claims.

What I claim as new and desire to secure by Letters Patent of the United States is:

1. A composite metal comprising an alkaline metal with a magnesium coating thereon, the alkaline metal being more readily oxidizable than the magnesium and both metals being capable of acting as "getters".

2. A composite metal comprising a foundation metal capable of acting as a "getter" and a coating of magnesium on said foundation metal, the foundation metal being more readily oxidizable than the magnesium, the magnesium and foundation metal both being capable of acting as "getters".

3. Calcium with a magnesium coating thereon, both of said metals being capable of acting as "getters".

In witness whereof, I have hereunto set my hand this 8th day of January, 1926.

WILLIAM ANDREW RUGGLES.